UNITED STATES PATENT OFFICE.

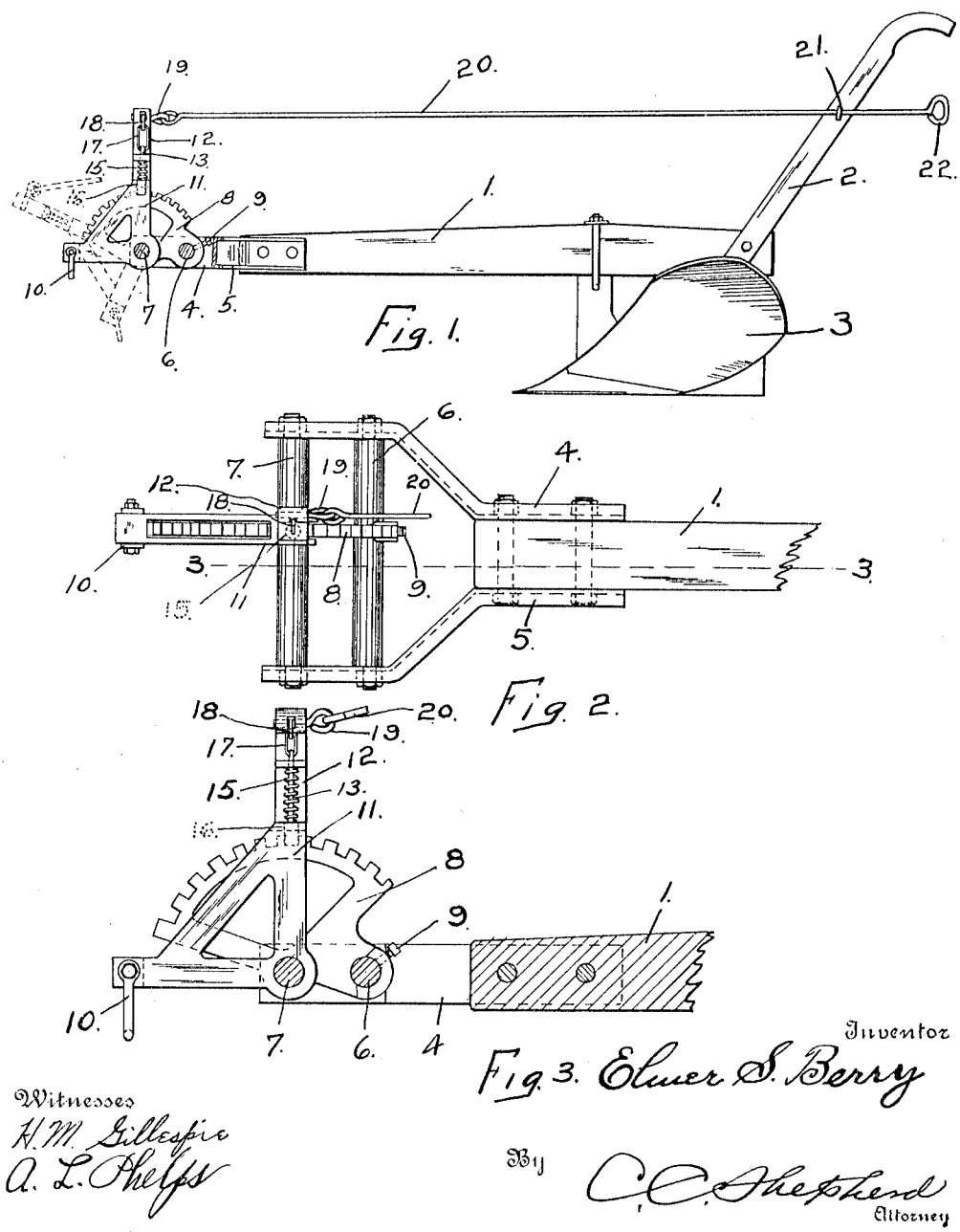

ELMER S. BERRY, OF HEBRON, OHIO.

DRAFT ATTACHMENT FOR PLOWS.

1,119,226.  Specification of Letters Patent.  Patented Dec. 1, 1914.

Application filed May 20, 1912. Serial No. 698,589.

*To all whom it may concern:*

Be it known that I, ELMER S. BERRY, a citizen of the United States, residing at Hebron, in the county of Licking and State of Ohio, have invented certain new and useful Improvements in Draft Attachments for Plows, of which the following is a specification.

My invention relates to draft attachment for plows and particularly relates to the provision of an improved structure of attachment whereby the depth and width of the furrow may be readily regulated, as well as the relative space of such furrows. It is aimed to provide a structure of attachment which facilitates and renders possible the adjustment of the inclination of the plow blade with relation to the draft apparatus by the plowman without the necessity of forsaking his position at the handle of the plow.

Therefore, my invention contemplates the provision of a plow beam and plow supported therefrom, together with a draft element which is desirably pivotally secured to the plow beam and which is adjustable by the operator by the temporary release of a locking mechanism used in conjunction therewith.

More specifically still, my invention contemplates the provision of a segmental rack carried upon the plow beam at the point of juncture with the pivoted draft element and a complemental bolt carried by said draft element and under the control of a reach rod extending to a point adjacent the handle of the plow.

My invention further aims to provide, specifically, a draft element laterally adjustable with relation to the plow beam, so as to vary the line of draft and consequently vary the width of the successive furrows.

The preferred embodiment of my invention is shown in the accompanying drawings, in which similar characters of reference designate corresponding parts, and in which:

Figure 1 is a side elevation partially in section of my plow, Fig. 2 is a plan view of the forward portion of the plow showing the manner of connection and adjustable structure of the draft element, and, Fig. 3 is a longitudinal section taken on line 3—3 of Fig. 2.

In the drawings, the plow is shown as comprising a plow beam 1, handles 2, and a plow blade 3. Disposed upon the forward end of the plow beam 1 is a yoke element having divergent legs 4 and 5 which are joined at their forward extremities by horizontally alining shafts 6 and 7. The horizontally alining shaft 6 may be of any cross sectional contour, but the shaft 7 is desirably cylindrical. Spanning and mounted upon these two shafts is a segmental rack element 8 bored for the reception of such shafts and capable of sliding thereon, but subject to the restraint of a set screw 9 which passes therethrough and into contact with the shaft 6. The draft element is, in fact, a complemental portion of this rack structure, in that it comprises not only the draft ring 10, but a yoke 11 having a vertical standard 12 and a bolt 13 normally forced downward by a spring 15. This yoke 11 is desirably bifurcate in its nature and embraces the rack element 8. Furthermore, the yoke is pivotally carried upon the cylindrical shaft 7 and may be swung about said shaft, while in embracing relation to the rack 8. The bolt 13 passes through a bore 16 formed in the yoke 11 and under normal pressure of the spring 15 extends into coactive relation with the teeth of the rack 8, normally serving to lock the yoke against movement about its shaft 7. The upper end of the bolt 13 is connected by means of a link 17 with a radial extension 18 of a pin 19 which is adapted upon rotation of the pin 19 in one direction, to draw the link 17 upwardly and thereby temporarily release the bolt from the rack element 8. It will be understood that this is necessarily temporary because upon release of the pin 19, the pin 15 automatically returns the bolt to operative position with relation to the rack 8. The pin 19 is under the control of a reach rod 20 which extends through a staple 21 upon the plow handle. This reach rod 20 may be provided with a handle 22.

In operation, it may be considered that the plow beam and draft element are in normal relative position as shown in Fig. 3. If it is desired to vary the inclination of the plow blade and to thereby vary the depth and width of the furrow, the reach rod 20 may be grasped and rotated to release the bolt. When this bolt is released the reach rod may be either drawn rearward or pushed forward and in either event, the inclination of the plow blade will be varied and the depth regulated. It will, of course, be apparent that the drawing of the reach rod 20 rearward will increase the depth of the furrow, whereas the pushing of such reach rod forward, will decrease the depth. If it is desired to alter the spacing of the furrows in relation to each other, the set screw 9 is loosened and the rack and yoke elements laterally shifted. This movement of the draft element laterally with relation to the plow beam, necessarily varies the relative spacing of the successive furrows, for the reason that the horse drawing the plow, walks in the last furrow made.

What I claim, is:

1. A draft attachment for a plow comprising a yoke member, shafts spanning said yoke member, a rack element slidably mounted on said shafts, a clevis frame pivotally mounted on said shaft, an upwardly extending bifurcated arm embracing said rack, and a spring latch mounted in said arm for engaging the teeth of said rack to control adjustment of said frame.

2. A draft attachment for a plow comprising a clevis mounted on the end of the plow beam, a transverse shaft carried by said clevis, a segmental rack carried by said clevis and adjustable laterally on said shaft, a bifurcated draft element pivotally carried by said shaft and straddling said rack, a bolt structure on said element and complemental to said rack, and a rod to operate said bolt structure to vary the draft of a furrow and operable from the handle of the plow.

In testimony whereof I affix my signature in presence of two witnesses.

ELMER S. BERRY.

Witnesses:
C. C. SHEPHERD,
WALTER E. L. BOCK.

Copies of this patent may be obtained for five cents each, by addressing the "Commissioner of Patents, Washington, D. C."